UNITED STATES PATENT OFFICE.

PAUL BRONNER, OF STUTTGART, GERMANY.

PROCESS OF MANUFACTURING WHITE LEAD.

SPECIFICATION forming part of Letters Patent No. 491,635, dated February 14, 1893.

Application filed October 6, 1892. Serial No. 448,077. (No specimens.)

*To all whom it may concern:*

Be it known that I, PAUL BRONNER, philosophiæ doctor, a subject of the Emperor of Germany, residing at Stuttgart, in the Empire of Germany, have invented certain new and useful Improvements in the Process of Manufacturing White Lead; and I do hereby declare that the following is a full, clear, and exact description of the invention, which will enable others skilled in the art to which it appertains to make and use the same.

According to this process oxide of lead and white lead are made from crude sulphate of lead. Crude sulphate of lead occurring in cotton printing works, and mostly of a yellowish or brownish color, always contains, besides the solution of acetate of aluminium adhering to it, a small quantity of basic aluminium salts (basic sulphate and basic acetate of aluminium) which owing to their dissolving with great difficulty in water, cannot be eliminated completely by mere washing—and also certain indissoluble organic coloring matter originating from the tar contained in wood vinegar. I now mix the crude sulphate of lead with a little sulphuric acid, adding sufficient water so as to form a thin sort of cream. I heat the mixture to boiling point by introducing steam, wash the whole and sift. By adding sulphuric acid to the crude sulphate of lead the two basic aluminium salts are changed into a normal sulphate of aluminium which easily solves and is removed by washing. The sulphate of lead now contains no other impurities but the above mentioned organized bodies. The sulphate of lead is then digested with a solution of carbonate of soda, by which process a solution of sulphate of soda (Glauber's salt) and a precipitate of a carbonate of lead is obtained. I wash the latter, dry it and then anneal it in a muffle. By this calcination the carbonate of lead is decomposed, the mentioned organic matter destroyed, and a small quantity of metallic lead originates, but oxidizes at once again through the oxygen of the air and the high temperature. The carbonate of lead is now changed into pure oxide of lead, free from copper, iron and antimony. This pure oxide of lead is very suitable for all purposes, especially for making crystal glass, for glazing in faience works for minium and white lead.

In order now to produce white lead I follow Thénard's method *i. e.* digest the oxide of lead with a solution of sugar of lead, which dissolves the former very readily and decomposes the solution of basic acetate of lead by a jet of carbonic acid. The solution of sugar of lead, lying on the top of the precipitated white lead is then again digested with the same quantity of oxide of lead as before and so on. By this simple and cheap method, crude sulphate of lead which hitherto owing to its yellowish or brownish tint was unsuitable for colors and could only be used by reducing it to metallic lead in the furnace, may be converted into pure oxide of lead or in white lead of the best quality. The mud of the lead chambers in sulphuric acid manufactories, as it does not require being previously treated with sulphuric acid must be washed well in water and digested after with carbonate of soda and then be treated as described hereinbefore.

Having fully described my invention, what I claim and desire to secure by Letters Patent is:

The process of manufacturing pure oxide of lead and white lead from crude sulphate of lead, which consists in digesting it, if necessary with sulphuric acid then washing it and treating it with a solution of carbonate of soda, washing, drying and annealing in a muffle the carbonate of lead thus produced, then digesting the pure oxide of lead with a solution of sugar of lead and ultimately precipitating the basic acetate of lead with carbonic acid, all substantially as described.

PAUL BRONNER.

Witnesses:
THEODOR STEUDEL,
WILLY ECKERT.